US009811410B2

(12) United States Patent
Goto et al.

(10) Patent No.: US 9,811,410 B2
(45) Date of Patent: Nov. 7, 2017

(54) DATA TRANSFER DEVICE, DATA TRANSFER METHOD, AND NON-TRANSITORY COMPUTER READABLE MEDIUM

(71) Applicant: TOSHIBA MEMORY CORPORATION, Minato-ku (JP)

(72) Inventors: Masataka Goto, Yokohama (JP); Eimi Murakami, Suginami (JP); Haruhiko Akiyama, Koganei (JP); Tatsuya Sasaki, Ota (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 93 days.

(21) Appl. No.: 14/658,709

(22) Filed: Mar. 16, 2015

(65) Prior Publication Data
US 2015/0269046 A1    Sep. 24, 2015

(30) Foreign Application Priority Data

Mar. 18, 2014 (JP) ................................. 2014-055562

(51) Int. Cl.
*G06F 11/00* (2006.01)
*G06F 11/07* (2006.01)
*G06F 12/08* (2016.01)

(52) U.S. Cl.
CPC ...... *G06F 11/0793* (2013.01); *G06F 11/0727* (2013.01); *G06F 12/08* (2013.01)

(58) Field of Classification Search
USPC ....................................................... 714/6.21
See application file for complete search history.

(56) References Cited

U.S. PATENT DOCUMENTS

| 8,103,824 | B2* | 1/2012 | Pollack ................. G06F 3/0605 711/114 |
| 2006/0026459 | A1* | 2/2006 | Otsuka ................. G06F 11/1456 714/6.22 |

(Continued)

FOREIGN PATENT DOCUMENTS

| JP | 2002-99465 A | 4/2002 |
| JP | 2014-235531 A | 12/2014 |

OTHER PUBLICATIONS

"Memcached—a distributed memory object caching system" Memcached, Apr. 27, 2015, 2 Pages.

*Primary Examiner* — Sarai Butler
(74) *Attorney, Agent, or Firm* — Oblon, McClelland, Maier & Neustadt, L.L.P.

(57) ABSTRACT

In a data transfer device that communicates with a communication device via a network, the storage controller controls reading data from and writing data to a plurality of storages. The correspondence information manager manages correspondence information manager to manage correspondence information between data written by the storage controller and a storage to which the data is written. The storage manager manages an invalid storage being a storage that the storage controller failed to read or write data. The communicator receives an acquisition request message for data from the communication device. The specifier specifies a storage storing the data requested, according to the correspondence information. The reader requests the storage controller to read the data from the storage specified by the specifier when the storage does is not the invalid storage, and not to request the storage controller to read the data when the storage is the invalid storage.

20 Claims, 8 Drawing Sheets

(56) References Cited

U.S. PATENT DOCUMENTS

| | | | |
|---|---|---|---|
| 2011/0225347 A1* | 9/2011 | Goss | G06F 12/0246 |
| | | | 711/103 |
| 2012/0042203 A1* | 2/2012 | Nakamura | G06F 11/0727 |
| | | | 714/6.22 |
| 2013/0024734 A1* | 1/2013 | Katsuragi | G06F 3/0611 |
| | | | 714/55 |

* cited by examiner

KEY-DATA LOCATION CORRELATION TABLE

| KEY | FILE DISCRIPTOR | OFFSET | MESSAGE LENGTH |
|---|---|---|---|
| key1 | 3 | 0 × 100 | 1231 |
| key2 | 4 | 0 × 0 | 321 |
| key3 | 5 | 0 × 1000 | 3454 |
| key4 | 6 | 0 × 2800 | 45 |
| | | | |
| | | | |

FIG. 3

DATA STORING LOCATION TABLE

| path | FILE DISCRIPTOR | OFFSET |
|---|---|---|
| /mnt1/FILE 1 | 3 | 0 × 1200 |
| /mnt2/FILE 2 | 4 | 0 × 1000 |
| /mnt3/FILE 3 | 5 | 0 × 1400 |
| | | |
| /mntn/FILE n | m | 0 × 1800 |

FIG. 4

DATA STORING LOCATION TABLE

| path | FILE DISCRIPTOR | OFFSET |
|---|---|---|
| /mnt1/FILE 1 | 3 | 0 × 1200 |
| /mnt2/FILE 2 | 4 | 0 × 1000 |
| ~~/mnt3/FILE 3~~ | ~~5~~ | ~~0 × 1400~~ |
| | | |
| /mntn/FILE n | m | 0 × 1800 |

INVALID

FIG. 5

DATA TRANSFER DEVICE, DATA TRANSFER METHOD, AND NON-TRANSITORY COMPUTER READABLE MEDIUM

CROSS-REFERENCE TO RELATED APPLICATIONS

This application is based upon and claims the benefit of priority from Japanese Patent Application No. 2014-055562, filed Mar. 18, 2014; the entire contents of which are incorporated herein by reference.

FIELD

Embodiments described herein relate to a data transfer device, a data transfer method, and a non-transitory computer readable medium.

BACKGROUND

Conventional data storing devices store data in files on a storage, and, upon request from a client, read out data from the storage to transmit the read-out data to the client. For data which is frequently accessed, high-speed responses are achieved by locating the data in a DRAM. However, this scheme has a problem that a high-capacity DRAM is required to achieve a high-speed response with a large storage capacity. In addition, in the event of a failure of the storage, there is another problem that responsiveness to a client is largely deteriorated or a server stops functioning.

BRIEF DESCRIPTION OF THE DRAWINGS

FIG. 3 is a diagram showing an example of a key-data location correlation table according to the first embodiment;

FIG. 4 is a diagram showing an example of a data storing location table according to the first embodiment;

FIG. 5 is a diagram showing an example of deleting an entry according to the first embodiment;

DETAILED DESCRIPTION

According to one embodiment, there is provided a data transfer device that communicates with a communication device via a network, including: a storage controller, a correspondence information manager, a storage manager, a communicator, a specifier and a reader.

The storage controller controls reading data from and writing data to a plurality of storages.

The correspondence information manager manages correspondence information correspondence information between data written by the storage controller and a storage to which the data is written.

The storage manager manages an invalid storage being a storage that the storage controller failed to read or write data.

The communicator receives an acquisition request message for data from the communication device.

The specifier specifies a storage storing the data requested by the acquisition request message, according to the correspondence information.

The reader requests the storage controller to read the data from the storage specified by the specifier when the storage does is not the invalid storage, and not to request the storage controller to read the data when the storage is the invalid storage.

Hereinafter, embodiments are described with reference to the drawings.

Embodiment 1

Figure 1:
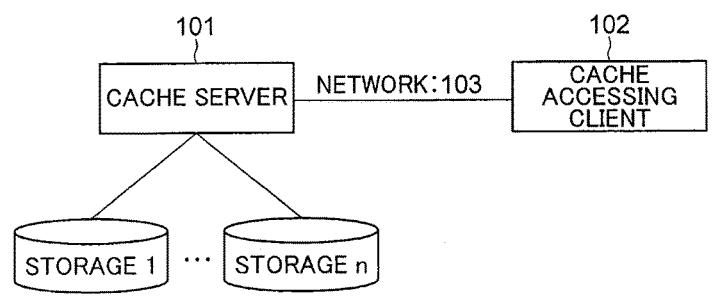
FIG. 1 is a diagram showing a general configuration of a data transfer system according to a first embodiment.

FIG. 1 shows a general configuration of a data transfer system including a cache server, having a data transfer device according to the present embodiment, and a cache accessing client (hereinafter referred to as "client").

A cache server 101 is connected with a client 102 via a network 103. Although only a single client is shown, a plurality of clients may be connected with the network 103.

The network 103 is any one of a wired network, a wireless network, and a hybrid thereof. Although a LAN (Local Area Network) such as Ethernet (registered trademark) is assumed herein, a network of another scheme, such as a wireless LAN, may be used.

The client 102 transmits and/or receives messages to and/or from the cache server 101 according to procedures (a cache protocol) defined for the cache server 101. The client 102 is a communication device such as a personal computer, a smartphone, a tablet terminal, and a portable terminal. The cache server 101 has a plurality of storages from storage 1 to storage "n" ("n" is an integer greater than 1) which store data. The cache server 101 includes a storage controller which controls reading from and writing to the storages 1 to "n".

The cache server 101 shall apply, as a method to store data in storages, a storing method where keys and values (data) are correlated. Thus, the cache server 101 may also be called "key value store (KVS) server" and the client 102 as "KVS client".

A representative cache protocol is the memcached protocol (https://github.com/memcached/memcached/blob/master/doc/protocol.txt), which is assumed to be in use in the present embodiment. However, it may be substituted by a separate similar protocol.

The storages 1 to "n" are configured according to any file system. Representative file systems include the FAT file system (https://www.microsoft.com/ja-jp/mic/iplicense/ip-ventures/FATFileSystem.aspx) and Linux ext4 (https://ext4.wiki.kernel.org/index.php/Main_Page). The storages 1 to "n" may be configured by any file system according to policies set by an administrator.

The cache server 101 receives a data storage request message containing data to be stored from the client 102. After receiving the data storage request message, the cache server 101 generates a response message containing the data according to a response format of the cache protocol. The cache server 101 stores the response message in a single storage selected from the storages 1 to "n". Furthermore, when receiving a data acquisition request message from the client 102, the cache server 101 specifies a storage storing a response message containing data requested for acquisition and reads out the response message from the specified storage. The cache server 101 adds a header to the read-out response message, generates a packet, and transmits the packet to the client 102. In fact, when receiving a data storage request message, the cache server 101 generates and store a response message in a storage so that, when receiving a data acquisition request message, the cache server 101 reads out the response message which has already been generated, from the storage and transmits the response message, thereby allowing a high-speed response. It should be noted that the client transmitting the data storage request message and the client transmitting the data acquisition request message may and may not be the same client.

In the memcached protocol, a data storage request message corresponds to a SET request message, and a data acquisition request message corresponds to a GET request message in this protocol. Hereafter, by assuming the memcached protocol, terms of SET request message and GET request message are used.

Figure 2:
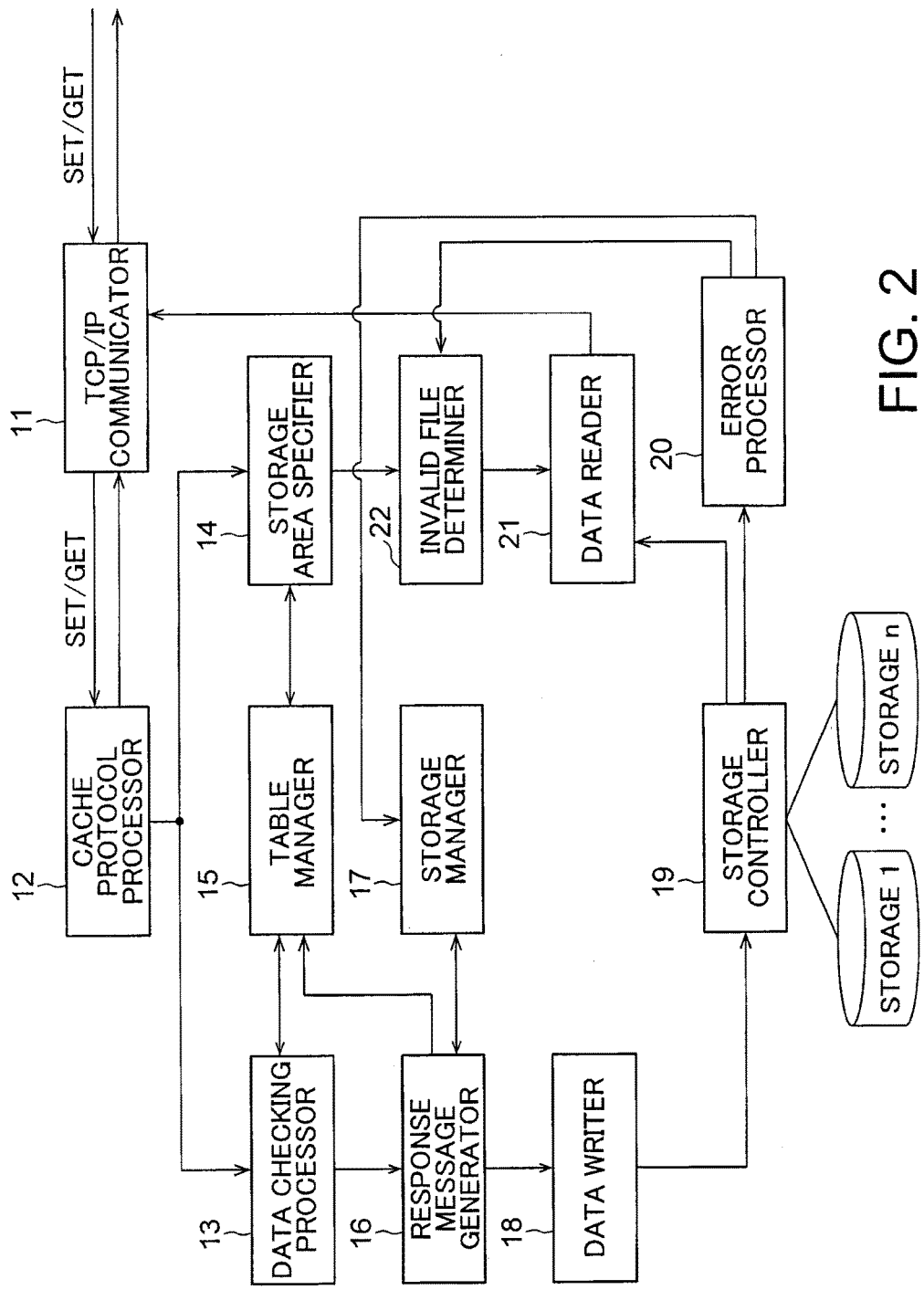
FIG. 2 is a diagram showing an internal configuration of the data transfer device according to the first embodiment.

FIG. 2 shows an internal configuration of the data transfer device according to the present embodiment. This data transfer device includes a TCP/IP communicator 11, a cache protocol processor 12, a data checking processor 13, a storage area specifier 14, a table manager (a correspondence information manager) 15, a response message generator 16, a storage manager 17, a data writer 18, a storage controller 19, an error processor 20, a data reader 21, and an invalid file determiner 22.

The TCP/IP communicator 11 communicates with the client 102 over the network 103 in accordance with the TCP/IP communication protocols. The TCP/IP communicator 11 may have a function to manage a session with a client in collaboration with an OS (Operating System) operating within a CPU.

The TCP/IP communicator 11 passes a communication message received from the client 102 to the cache protocol processor 12 and transmits a communication message received from the cache protocol processor 12 to the client 102 via the network 103. In the present embodiment, it is mainly assumed that, as communication messages, request messages conforming to the cache protocol specification are received and response messages thereto are transmitted.

In the present embodiment, varieties of request messages received via the network 103 include a SET request message requesting to store data and a GET request message requesting to acquire data. The SET request message includes a SET command, which contains a key and data. The GET request message includes a GET command, which contains a key. Other varieties of request messages are also acceptable.

The cache protocol processor 12 receives a request message sent from the client 103 from the TCP/IP communicator 11. For example, the cache protocol processor 12 receives a request message from an OS by receiving a system call "recv( )" from the OS. The cache protocol processor 12 interprets a content of the request message. As a result of interpretation, if a type of the request message is determined to be a SET request, a key and data contained in the SET command are passed to the data checking processor 13. If it is determined to be a GET request, a key contained in the GET command is passed to the storage area specifier 14.

Furthermore, the cache protocol processor 12 has a function to generate a response message to the request message in accordance with the cache protocol specification and to pass the response message to the TCP/IP communicator 11. For example, when receiving a SET request message, a response message showing an execution result of the SET command therein (success or failure, etc.) is returned. It should be noted that, when receiving a GET request message and returning a response message containing data requested by GET request, as will be described below, the data reader 21 reads out the response message from a storage and returns the response message.

The table manager 15 stores and manages a key-data location correlation table (correspondence information of keys and data locations). FIG. 3 shows an example of the key-data location correlation table. In the key-data location correlation table, a plurality of entries are stored, wherein each entry contains a set of a key, a file descriptor, an offset, and a data length.

A file descriptor is an identifier to identify a file in a storage retaining a response message corresponding to a key. The file descriptor is used to specify a file in a storage. An offset is a value indicating a location within the file. For example, it is a value indicating a byte location counted from the head of the file. A data length indicates a length of a response message. In the example shown in the figure, the key-data location correlation table is represented by a simple table. However, it is preferable that the table has a data structure which allows a high-speed search by a key, such as, a tree or a hash table where the key is used as a search key.

The data checking processor 13 checks whether the key-data location correlation table includes an entry containing an identical letter string as the key received from the cache protocol processor 12. When such entry is included in the table, the entry in the key-data location correlation table is invalidated. As a method of invalidation, it may be performed by deleting the entry or by setting a value showing that the entry is invalid. However, this invalidating processing is not mandatory and may be omitted. In this case, when adding an entry to the key-data location correlation table as will be described below, the entry having the same key may be overwritten. This allows to deal with the case where continuous processing of a GET command pertaining to the key is required during subsequent processing.

The data checking processor 13, after invalidating entries as required, passes the key and the data received from the cache protocol processor 12 to the response message generator 16.

The response message generator 16 generates a response message using the key and the data received from the data checking processor 13 in accordance with the cache protocol specification. The response message generated here is a response message corresponding to the GET command specifying the key. The response message contains the data received from the data checking processor 13.

The response message generator 16 requests the storage manager 17 to allocate a storage area in one storage out of the storages 1 to "n" to store the response message generated. In this request for allocation, a message length of the response message shall be included. The response message generator 16 receives information of the storage area allocated from the storage manager 17.

The storage manager 17 retains a data storing location table and manages allocations of storage areas of individual storages based on this table. The storage manager 17 allocates a storage area for storing the response message upon request from the response message generator 16. A storage area is identified by a file and an offset, for example. A file is associated with a particular single storage by the file system. In the case of a file system which allows file descriptor values to overlap among different storages, a storage area is identified also by an identifier of the storage in addition to the identifier of file and the offset.

FIG. 4 shows an example of the data storing location table. The data storing location table contains fields for paths, file descriptors, and offsets.

A path, in a file system, specifies a location where a storage or a file is mapped to. "mnt1", "mnt2", and "mntn" correspond to the storage 1, the storage 2, and the storage "n", respectively. A file descriptor is an identifier that allows to access to the file thereof. The file 1 corresponds to a file having the file descriptor 3, and the file "n" corresponds to a file having the file descriptor "m". An offset indicates a location where a subsequent allocation of a storage area may start from within a file having a corresponding file descriptor.

The example of FIG. 4 shows entries of "n" number of files. Each file is retained in a different storage. It should be noted that a plurality of files may be placed in a single storage, wherein entries for individual files may be set in the data storing location table.

It is assumed that offsets in the data storing location table are set to 0 (zero) in the initial state. It is also assumed that values for paths are fixed in advance, and file descriptors are set to values given in the initial processing of the device. However, this is merely an example, and thus these values may be set by other methods.

The storage manager 17 selects a storage by any method when allocating a storage area. For example, the storage manager 17 may select a storage so that each storage will be selected for the same number of times. One example is selecting a storage by the round robin method. Alternatively, a storage may be selected in a random manner. Also, as in the embodiment described below, a storage may be selected according to frequencies of access to individual storages in response to the GET request.

The storage manager 17 increases an offset, each time a storage area is allocated, by a size of a storage area allocated within a file. For example, when an area of 100 bytes are allocated, an offset is updated by adding 100 bytes to the offset.

Paying attention to sector boundaries of storages, the offset may be adjusted to become an integral multiple of the sector size thereof. For example, when allocating less than 512 bytes, then the offset may be updated by adding 512 bytes thereto. When allocating more than 512 bytes, then the offset may be updated with rounded up value by raising the offset to an integral multiple of 512 bytes.

The storage manager 17 returns the information of the allocated storage area to the response message generator 16. This information of the storage area returned to the response message generator 16 includes the file descriptor and the offset thereof. The identifier of the storage may also be included as required.

The response message generator 16 passes the response message generated, the message length of the response message, and the file descriptor and the offset returned from the storage manager 17 to the data writer 18. It should be noted that the message length of the response message may be calculated by the response message generator 16.

The data writer 18, based on the information passed from the response message generator 16, outputs information that instructs the storage controller 19 to write the response message.

The storage controller 19, according to the information instructed by the data writer 18, writes the response message in the file in the storage. Specifically, the storage controller 19 writes the response message in the file in the storage specified by the file descriptor, starting from the location specified by the offset.

The storage controller 19 writes the response message in the file in the storage in accordance with the specification of the file system being used. In addition, the storage controller 19 reads out a response message from a file in a storage upon a read request from the data reader 21, as will be described below. In the above manner, the storage controller 19 controls reading from and writing to storages.

More specifically, reading from and writing to storages are performed by a data-accessing unit called "sector", such as a unit of 512 bytes. Therefore, the storage controller 19 issues a command for writing or reading by each data-accessing unit and sends the command to the storage. As a specification of storage input and output, for example, SATA (https://www.sata-io.org/) is known. In the present embodiment, the storages are assumed to be SATA storages, but not limited thereto.

The storage receives the command for writing or reading from the storage controller 19 and executes the command. Then the storage returns a response indicating normal completion (success) of processing or abnormal termination (processing error, or failure) of processing to the storage controller 19. This response is returned in accordance with the specification of storage input and output.

In case of a normal completion of writing, the data writer 18 receives a notification of normal completion of writing from the storage controller 19 and commands the response message generator 16 to register an entry into the key-data location correlation table. The response message generator 16 adds the new entry (the key, the file descriptor, the offset, and the message length) into the key-data location correlation table. If there is an existing entry having the same key value, this entry may be overwritten.

Here, although the registration of the entry was performed by the response message generator 16, the data checking processor 13 or the data writer 18 may be configured to perform registrations of entries. Alternatively, a registration processor (not shown) that performs registrations of entries may be provided separately to have the registration processor perform registrations. In this case, the registration processor receives the notification of normal completion of writing from the storage controller 19 and registers the entry into the key-data location correlation table.

When detecting that the accessing storage experienced a writing or reading failure (error), the storage controller 19 notifies error information to the error processor 20. The error information includes information identifying a storage, a file, or a directory (e.g., a case where a single directory or a plurality of directories exist(s) between "mnt1" and the file 1 as shown in FIG. 4) which experienced the error.

Here, an error is detected when, for example, an error event is notified from a storage being accessed, or when no response is received from the storage within a predetermined time length (for example, the predetermined time length of SATA). Such an event occurs in the case of a storage failure, etc.

Depending on administrator settings, a prolonged accessing time to a storage by more than a certain time length may be deemed as an error (failure) as not satisfying a desired performance. For example, when it is preferred to complete processing in less than one millisecond, it is possible to detect an error when processing completes in more than one millisecond. In this case, the administrator sets the value of one millisecond beforehand for the storage controller 19 to determine whether a delay of more than a certain time length is experienced or not according to this value having been set.

The error processor 20, when receiving the error information from the storage controller 19, notifies inhibiting information to the storage manager 17. This inhibiting information specifies to inhibit new allocation of a storage area to a storage, a file, or a directory indicated in the error information. Also, the error processor 20 may further notify this inhibiting information to the invalid file determiner 22.

Thereafter, the storage manager 17, according to the inhibiting information notified from the error processor 20, operates not to allocate the storage, the file, or the directory indicated in the error information when requested to allocate a storage area in a storage from the response message generator 16. Specifically, the storage manager 17, according to the inhibiting information, invalidates any entry containing the storage, the file descriptor, or the directory therein in the data storing location table. An invalidated storage is referred to as "invalid storage", and a file of which file descriptor is invalidated is referred to as "invalid file". An invalidated directory is referred to as "invalid directory". The storage manager 17 shall not allocate any storage area from any of such invalid storages, invalid files, and invalid directories.

For example, when assuming that an error occurred when accessing to a file having the file descriptor 5 in the storage 3. In this case, the error processor 20 notifies an information inhibiting allocation pertaining to the storage 3 or the file descriptor 5 to the storage manager 17. The storage manager 17 invalidates the entry having the file descriptor 5 in the data storing location table accordance to the inhibiting information. FIG. 5 shows an operation of invalidating the entry having the file descriptor 5. Thereafter, the storage manager 17 will not allocate a new storage area to the invalidated file having the file descriptor 5, to the invalidated storage 3 or to the like. This means that no new storage area is allocated to invalid files, to invalid storages or to the like. Incidentally, invalidation of an entry may be performed by deleting the entry itself from the table or by setting a value indicating invalidity of the entry thereto.

Here, the key-data location correlation table also contains the file descriptor of the file in the storage to which allocation is inhibited (in this example, the file descriptor 5 as shown in FIG. 4). However, deleting the entry having the file descriptor from the key-data location correlation table is not necessary. The reason for this is as follows.

It is assumed that a key-data location correlation table may retain numerous entries (e.g., several hundreds of millions) therein. In such a case, deleting an entry upon occurrence of an error could deteriorate response performance of the cache server due to delayed processing during the deletion. Moreover, if the table manager 15 has a search function whereby a file descriptor is used as a search key, responses of the search function could be severely deteriorated.

It should be noted that, in the case of a failed writing of a response message, the response message generator 16 may have the storage manager 17 to reallocate a storage area from a file or a storage different from the file or the storage to which writing failed. Then, the response message generator 16 may send a writing request to the storage controller 19 again. Alternatively, a response message indicating the failure of writing may be generated by the cache protocol processor 12 or the like and be transmitted to the client 102 via the network 103. In these cases, the error processor 20 may notify error information to the response message generator 16 and/or to the cache protocol processor 12.

The storage area specifier 14 receives the key contained in the GET request message from the cache protocol processor 12. The storage area specifier 14 then checks whether the key is contained in the key-data location correlation table. When the key is not contained therein, it is determined that there is no data to be responded. In this case, a response message as such may be returned via the cache protocol processor 12. When the key is contained therein, the file descriptor, the offset, and the message length (data length) are read out from the entry having this key.

The storage area specifier 14 passes the file descriptor read out to the invalid file determiner 22. The invalid file determiner 22 then determines whether the file descriptor is an invalid file descriptor or not. If the file descriptor specifies a file in a storage where an error was experienced, the storage area specifier 14 determines the file descriptor as invalid.

Invalidity may be determined by making an inquiry to the storage manager 17 to confirm whether the file descriptor or a storage or a directory having the file descriptor is valid or not. Alternatively, when the error processor 20 notifies the inhibiting information to the storage manager 17, the inhibiting information may be notified also to the invalid file determiner 22 to be stored in the invalid file determiner 22.

In the case of an invalid file descriptor, the invalid file determiner 22 determines not to access any storage and does not pass the file descriptor, the offset, and the message length to the data reader 21. This avoids an error that occurs when the storage was tentatively accessed. If the file descriptor is determined as not being invalid (i.e. valid), then the invalid file determiner 22 passes the file descriptor, the offset, and the message length to the data reader 21. The identifier of the storage may also be passed as required.

The data reader 21 reads out the response message via the storage controller 19 according to the file descriptor, the offset, and the message length. The read-out response message contains data corresponding to the key specified by the GET command. The data reader 21 passes the read-out response message to the TCP/IP communicator 11. The TCP/IP communicator 11 transmits the response message received as a response to the GET request message from the cache accessing client. Since the response message to the GET command is generated beforehand, a high-speed response to the GET request message is made available.

It should be noted that an error might occur in a storage being accessed when the data reader 21 is reading therefrom via the storage controller 19. In such a case, as in the above described case of error occurrence during writing, access inhibiting processing can be performed with the error processor 20. Specifically, the error processor 20 notifies inhibiting information, which inhibits allocation to the storage, the file, or the directory where the accessing error occurred, to the storage manager 17. The inhibiting information may further be notified to the invalid file determiner 22. Thereafter, the storage manager 17 operates not to allocate the storage, the file, or the directory indicated in the inhibiting information.

As described above, the present embodiment allows enhancing storage capacity and data response performance using a plurality of storages while suppressing deterioration of storage performance and/or making tolerant against failures.

In fact, the present embodiment secures storage capacity by using a plurality of storages.

Moreover, the present embodiment enables high-speed responses by allowing to store a response message in the form of a response to a GET request, thereby allowing to read out and transmit the response message upon receiving the GET request.

In addition, the present embodiment inhibits writing to and/or reading from a storage when the storage experiences a failure of writing and/or reading. If a storing location of data requested by a GET request is in the storage where writing and/or reading is inhibited, no reading from the storage is performed. This allows avoiding an error occurrence during reading therefrom, thereby suppressing deterioration of response performance.

Furthermore, according to the present embodiment, when writing to and/or reading from a storage fail(s), usage of that storage is inhibited, thereby allowing the like processing to continue with the rest of the storages. Thus, service outages with clients can be avoided.

Embodiment 2

Figure 6:
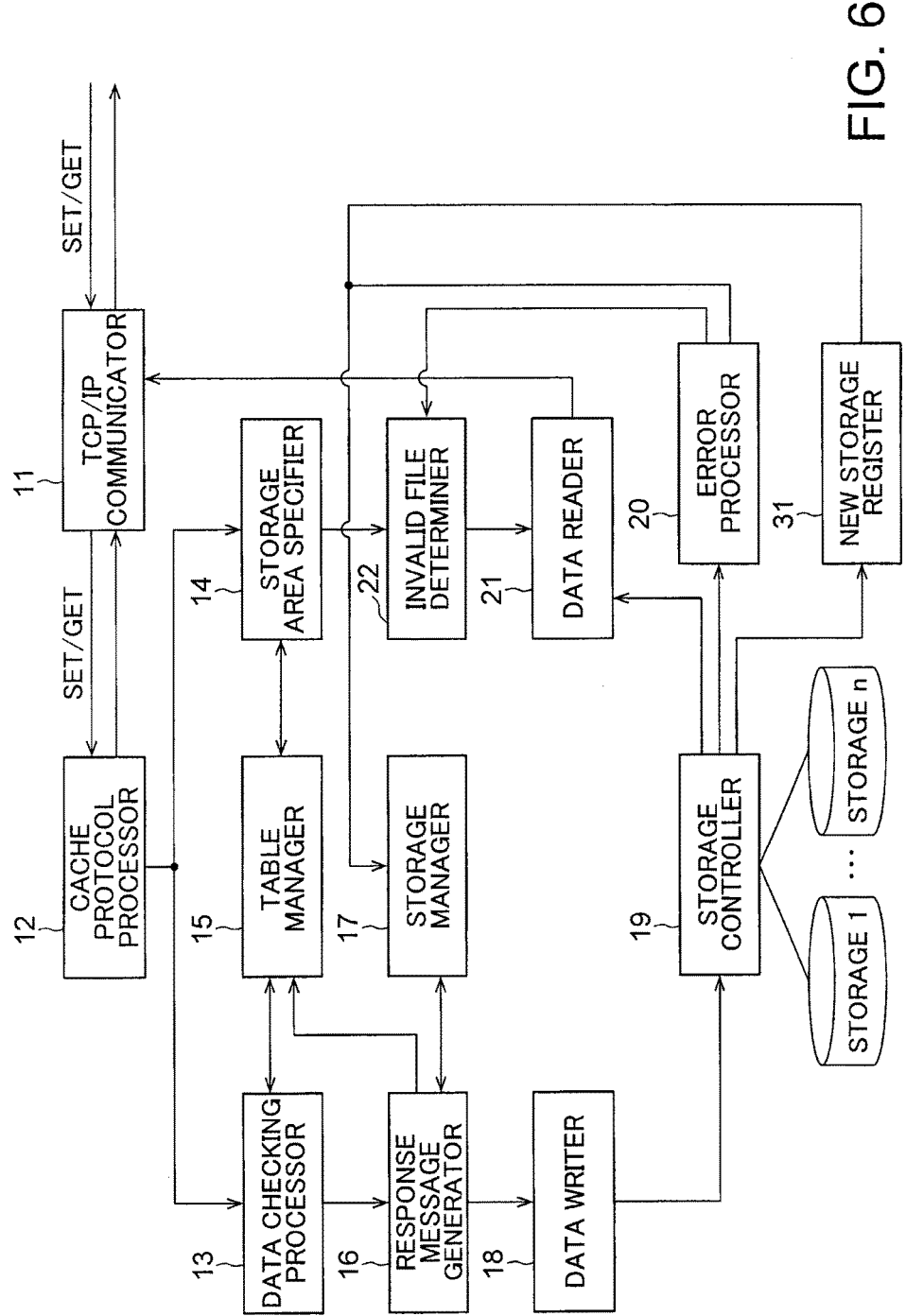
FIG. 6 is a diagram showing a data transfer device according to a second embodiment.

FIG. 6 shows a data transfer device according to a second embodiment. A new storage register 31 is added to the data transfer device according to the first embodiment as shown in FIG. 2.

The new storage register 31 performs processing when expanding storages (adding a storage) while the cache server is in operation. When a storage is added, the new storage register 31 receives information about the expanded storage from the storage controller 19. With this, the new storage register 31 detects the new storage added. The new storage register 31 then notifies the information about the new storage to the storage manager 17 so that allocating a new storage area to the added storage becomes possible. The information about the new storage to be notified includes identification information of the newly added storage, file descriptors of files allocated to the storage, and directories in the paths to those files.

When receiving the notification of the information about the new storage from the new storage register 31, the storage manager 17 adds a new entry (a path, a file descriptor, and an offset) relating to the storage to the data storing location table. It is assumed that a default value for an offset is, for example, zero.

As described above, the present embodiment allows effective processing even when a storage is newly added.

Embodiment 3

Figure 7:
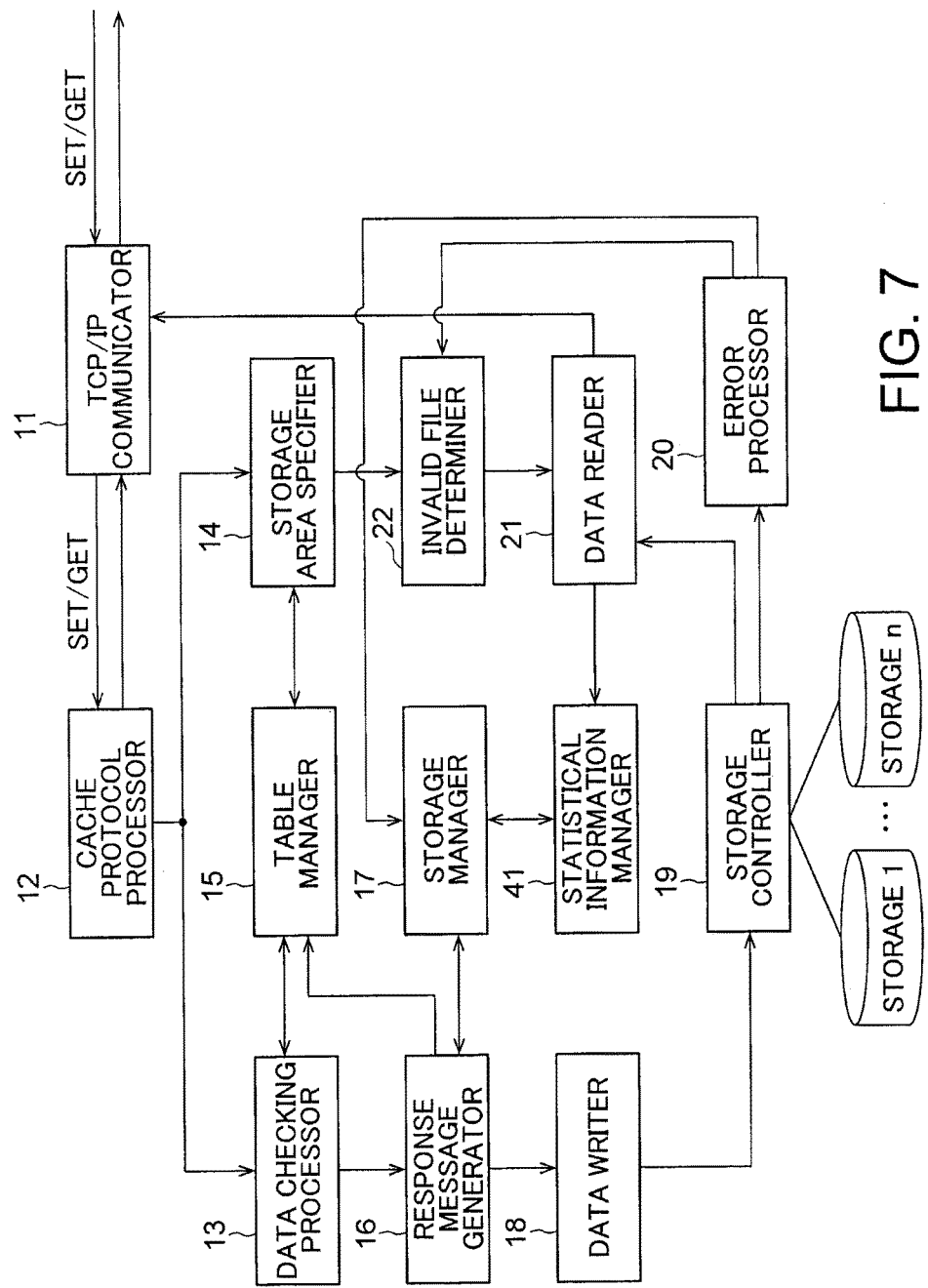
FIG. 7 is a diagram showing a data transfer device according to a third embodiment.

FIG. 7 shows a data transfer device according to a third embodiment. A statistical information manager 41 is added to the data transfer device according to the first embodiment as shown in FIG. 2.

The statistical information manager 41 manages statistical information corresponding to frequencies of storage access resulting from GET commands. The statistical information manager 41 is notified which storage is being accessed when the data reader 21 accesses a storage via the storage controller 19. This allows the statistical information manager 41 to calculate and manage statistical information corresponding to frequencies of storage access. The statistical information manager 41 may manage statistical information corresponding to frequencies of access not only by storages but also by file descriptors and/or by directories.

Figure 8:
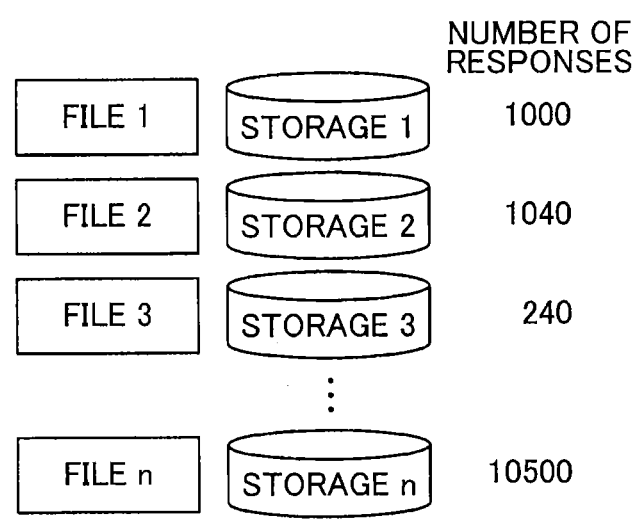
FIG. 8 is a diagram showing an example of statistical information according to the third embodiment.

FIG. 8 shows an example of statistical information managed by the statistical information manager 41. Each storage has one file therein respectively. Each time the data reader 21 accesses any file in any storage, the data reader 21 notifies this access to the statistical information manager 41. The statistical information manager 41 calculates statistical information, such as, a total number of notifications, as the number of responses (frequency of reading). This number of responses may be a cumulative number from activation of the system. Alternatively, the cumulative number may be reset to a predetermined number every certain period of time, for example, the cumulative number may be reset to 0 (zero) every 10 seconds or every 1 minute. In this case, the number of responses is interpreted as a value showing a frequency of access for the last 10 seconds or for the last 1 minute.

The statistical information described herein is one example, therefore, separate statistical information may be calculated. For example, the number of responses may be calculated for every certain period of time to obtain a moving average thereof. Alternatively, from the numbers of responses for certain period of time for the last "x" number of periods, values such as a maximum value, a minimum value, and a median thereof may be used as statistical information.

The storage manager 17 allocates a storage area responding to a request from the response message generator 16 based on the statistical information managed by the statistical information manager 41. Storages frequently accessed for reading have heavy processing loads. Therefore, the storage manager 17, for example, preferentially allocates a storage with a small number of responses.

Specifically, a storage may be selected from storages having the number of responses equal to or less than a threshold value. Alternatively, a storage may be selected from storages having the number of responses being relatively small. For example, a storage having a smallest number of responses may be selected. Alternatively, storages can be rated in ascending manner corresponding to the number of responses thereof so that a storage can be selected from storages in the top "x" number of ratings. With this method, it is expected that the numbers of reading from individual storages are equalized. Although examples using the number of responses are shown herein, it is expected that even when using statistical information other than the number of responses, making selections based on a similar idea would equalize of the numbers of reading from the individual storages.

Embodiment 4

Figure 9:
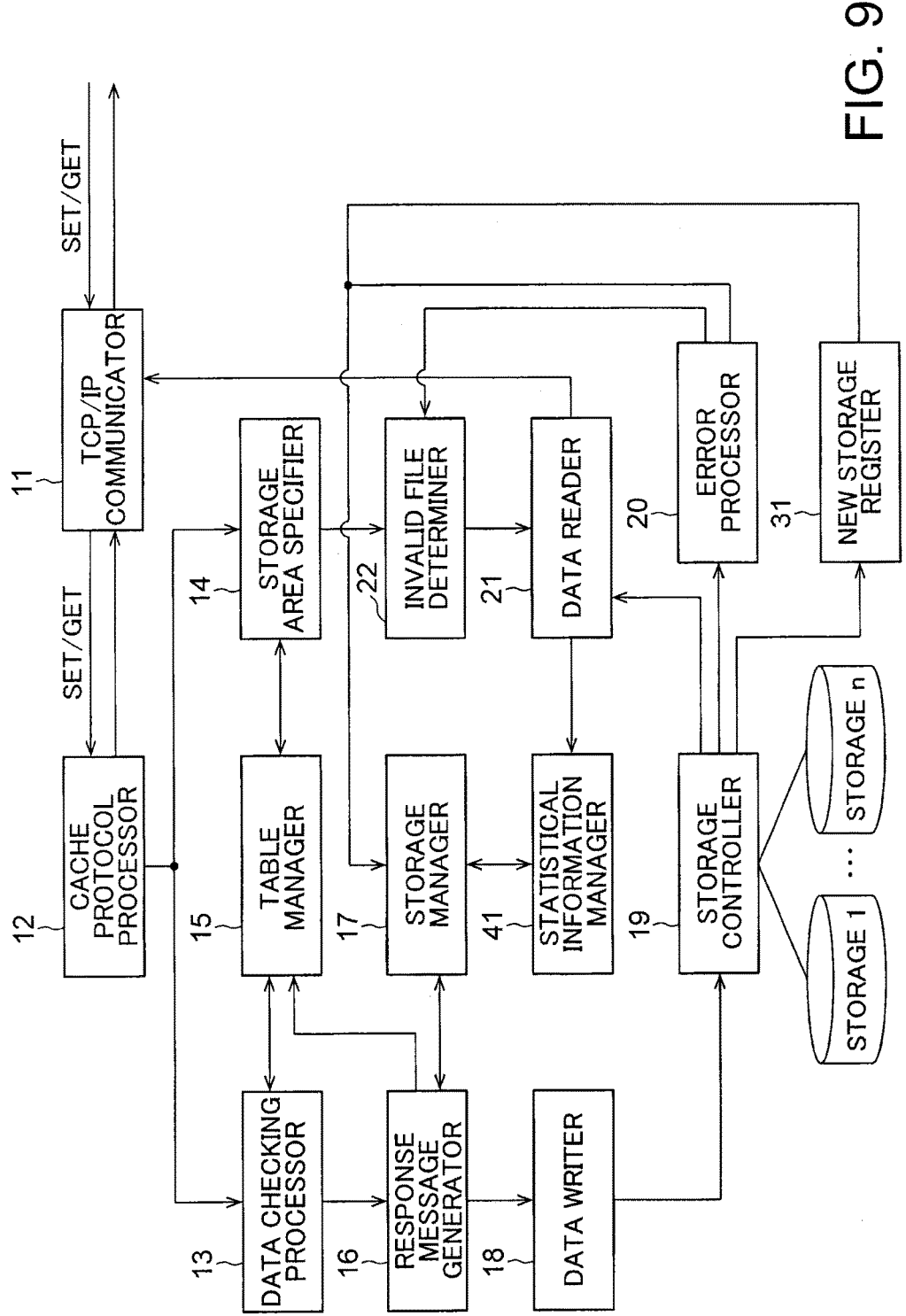
FIG. 9 is a diagram showing a data transfer device according to a fourth embodiment.

FIG. 9 shows a data transfer device according to a fourth embodiment, which is a combination of the second and the third embodiments. Namely, the data transfer device as shown in FIG. 9 includes the statistical information manager 41 and the new storage register 31. Behaviors in the present embodiment are obvious from the descriptions given for the second and the third embodiments, and thus omitted.

Embodiment 5

Figure 10:
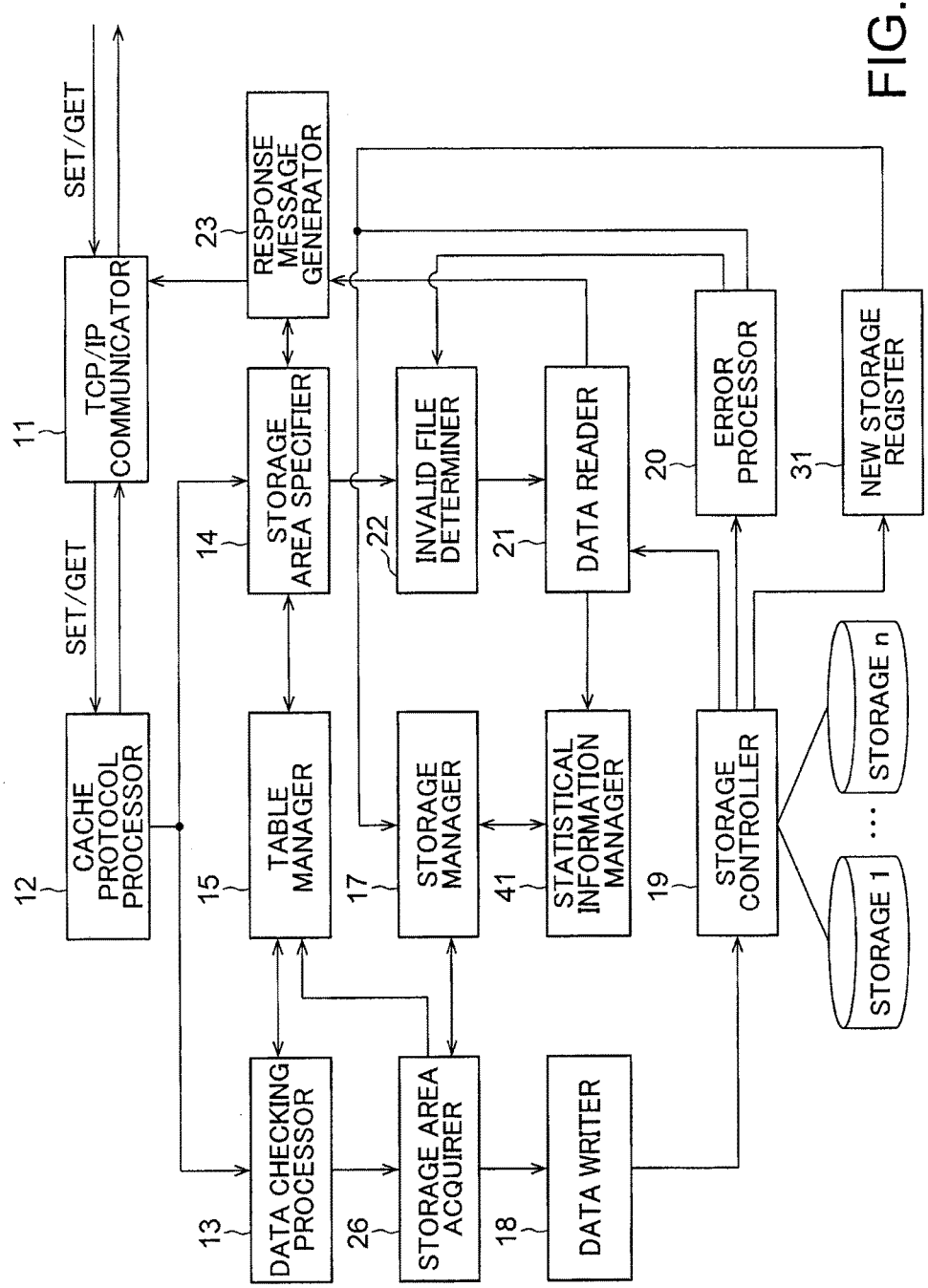
FIG. 10 is a diagram showing a data transfer device according to a fifth embodiment.

FIG. 10 shows a data transfer device according to a fifth embodiment. The response message generator 16 of the data transfer device according to the fourth embodiment as shown in FIG. 9 is replaced with a storage area acquirer 26. Also, a response message generator 23 is disposed between the data reader 21 and the TCP/IP communicator 11. Similar changes may be applied to the first to fourth embodiments.

In the first to fourth embodiments, when receiving a SET request message from a client, a response message to a GET request is generated and stored in a storage. Here, the response message contains data specified by the SET command. In the present embodiment, no response message is generated at the time of receiving the SET request message but data provided by the SET command is stored in the storage. Instead, when receiving the GET request message from the client, the data requested by the GET command is read out from the storage, and a response message containing the data is generated. In fact, GET response messages are generated not at the time of receiving SET requests but at the time of receiving GET requests. Hereinafter, only differences from the above described embodiments are described.

The data checking processor 13 receives the key and the data contained in the SET request message from the cache protocol processor 12 and checks whether the same key as this key exists in the key-data location correlation table. When such key exists in the table, an entry having this key is invalidated as required. This is the same as in the first embodiment. It should be noted that, in the present embodiment, the item "message length" in the key-data location correlation table shown in FIG. 3 is "data length".

The data checking processor 13 passes the key and the data to the data storage area acquirer 26. The storage area acquirer 26 requests the storage manager 17 to allocate a storage area in a storage based on the key and the data and receives information on the storage area allocated (a file descriptor and an offset). An identifier of the storage may also be received as required. The storage area acquirer 26 passes the data specified by the SET command, a data length of the data, and the file descriptor and the offset received from the storage manager 17 to the data writer 18.

The data writer 18, based on these information received, requests the storage controller 19 to write the data to the storage. In case of a normal completion of writing, the data writer 18 receives a notification of normal completion of writing from the storage controller 19 and commands the storage area acquirer 26 to register an entry into the key-data location correlation table. The storage area acquirer 26 registers the new entry (the key, the file descriptor, the offset, and the data length) into the key-data location correlation table.

Here, although the registration of the entry was performed by the storage area acquirer 26, the data checking processor 13 or the data writer 18 may be configured to perform this registration. Alternatively, a registration processor (not shown) that performs registrations of entries may be provided separately to have the registration processor perform registrations. In this case, the registration processor receives the notification of normal completion of writing from the storage controller 19 and registers the entry into the key-data location correlation table.

When receiving the GET request message, the data reader 21, after processing by the storage area specifier 14 and the invalid file determiner 22, requests the storage controller 19 to read out the data according to the file descriptor, the offset, and the data length. When the data is successfully read out, the data reader 21 sends the read-out data to the response message generator 23.

The response message generator 23 generates a response message containing the data in the form of a response to the GET command. More specifically, the response message generator 23, after receiving the data from the data reader 21, receives the key contained in the GET command from the storage area specifier 14. The response message generator 23 then generates a message header to generate the message in the form of a response to the GET command. The response message generator 23 further passes the message to the TCP/IP communicator 11. The TCP/IP communicator 11 transmits this message in response to the GET request message from a client.

As stated above, according to the present embodiment, even when an object to be stored in a storage is not a response message but is data itself, the same effects as in the first to fourth embodiments can be obtained.

The data transfer device as described above may also be realized using a general-purpose computer device as basic hardware. That is, each block in the data transfer device can be realized by causing a processor mounted in the above general-purpose computer device to execute a program. In this case, the data transfer device may be realized by installing the above described program in the computer device beforehand or may be realized by storing the program in a storage medium such as a CD-ROM or distributing the above described program over a network and installing this program in the computer device as appropriate. Furthermore, the storage may also be realized using a memory device or hard disk incorporated in or externally added to the above described computer device or a storage medium such as CD-R, CD-RW, DVD-RAM, DVD-R as appropriate.

Furthermore, the data transfer device may include a CPU (Central Processing Unit), a ROM (Read Only Memory) and a RAM as one example of circuitry. In this case, each unit or each element in the data transfer device can be controlled by a CPU's reading out into a RAM and executing a program which is stored in a storage or ROM.

Also, the above-stated hardware configuration is one example and the data transfer device according to an embodiment can be realized by an integrated circuit such as a LSI (Large Scale Integration) or an IC (Integrated Circuit) chip set as one example of circuitry. Each function block in the data transfer device can be realized by a processor, individually, or a part or all of the function blocks can be integrated and realized by one processor. A means for the integrating the part or all of the function blocks is not limited to the LSI and may be dedicated circuitry or a general-purpose processor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A data transfer device that communicates with a communication device via a network, comprising:
circuitry configured to implement:
a storage controller to control reading data from and writing data to a plurality of storages;
a correspondence information manager to manage correspondence information between data written by the storage controller and a storage to which the data is written;
a storage manager to manage an invalid storage, the invalid storage being a storage that the storage controller failed to read or write data;
a communicator to receive a data storage request message to store data;
a response message generator to generate a response message that contains the data requested by the data storage request message to be stored, the response message being generated in response to receiving the data storage request message to store the data, wherein the storage controller writes the response message containing the data to a storage in response to receiving the data storage request message, and the correspondence information manager manages correspondence information between the response message and the storage to which the response message is written, and wherein the response message containing the data is generated and stored for output responsive to a subsequent acquisition request message to retrieve the data contained in the response message;

a specifier to specify the storage storing the response message containing the data in response to the subsequent acquisition request message according to the correspondence information between the response message and the storage to which the response message is written, the subsequent acquisition request message for the data contained in the response message being received by the communicator from the communication device; and a reader to request the storage controller to read the response message containing the data from the storage specified by the specifier when the storage is not the invalid storage, and not to request the storage controller to read the response message containing the data when the storage is the invalid storage.

2. The device according to claim 1, wherein,
the circuitry is configured to implement a writer,
the communicator receives the data storage request message from the communication device,
the storage manager selects the storage to write the response message containing the data in response to the data storage request message, from the plurality of storages excluding the invalid storage,
the writer requests the storage controller to write the response message containing the data to the storage selected by the storage manager, and
the storage controller writes the response message containing the data to the storage based on the request from the writer.

3. The device according to claim 2, wherein,
the circuitry is configured to implement a new storage detector to detect that a new storage is added, the new storage being controlled by the storage controller, and
the storage manager performs selection from the plurality of storages including the new storage detected by the new storage detector.

4. The device according to claim 2, wherein,
the circuitry is configured to implement a statistical information manager to manage statistical information on frequencies of read requests to the plurality of storages, according to frequencies of read requests for the plurality of storages, and
the storage manager selects the storage according to the statistical information.

5. The device according to claim 4, wherein the storage manager preferentially selects a storage having a lower frequency of the read requests.

6. The device according to claim 2, wherein,
the storage manager, when the storage controller fails to write corresponding data requested by a corresponding data storage request message, selects another storage other than a corresponding storage to which writing failed; and
the writer requests the storage controller to write the corresponding data to said other storage.

7. The device according to claim 1, wherein, the communicator, when a corresponding storage specified by the specifier is the invalid storage, transmits a message to the communication device, the message indicating that corresponding data requested by the subsequent acquisition request message does not exist.

8. The device according to claim 1, wherein,
the plurality of storages are managed by a predetermined file system, each of the plurality of storages storing one or more files;
the storage controller controls reading data from and writing data to files in the plurality of storages;

the correspondence information manager manages correspondence information between data written by the storage controller and a file in which the data is written;
the storage manager manages an invalid file being a file, which the storage controller failed to read or write, or manages an invalid storage being a storage storing the invalid file;
the specifier specifies a file storing the data requested by the subsequent acquisition request message, according to the correspondence information between the data written by the storage controller and the file in which the data is written; and
the reader, when the file specified by the specifier is the invalid file or exists in the invalid storage, does not request the storage controller to read the data requested by the subsequent acquisition request message from the file specified by the specifier.

9. The device according to claim 8 wherein,
the circuitry is configured to implement a writer,
the storage manager selects a file to write the data requested by the data storage request message, from the files in the plurality of storages excluding the invalid storage or from the files excluding the invalid file,
the writer requests the storage controller to write the data in the file selected by the storage manager, and
the storage controller writes the data in the file based on the request from the writer.

10. The device according to claim 9, wherein,
the storage manager, when the storage controller fails to write corresponding data, selects another file other than a corresponding file to which writing failed, or another storage other than a corresponding storage to which writing failed, and
the writer requests the storage controller to write the corresponding data in said other file or in a file in said other storage.

11. The device according to claim 8, wherein, the communicator, when a corresponding file specified by the specifier is the invalid file or exists in the invalid storage, transmits a message to the communication device, the message indicating that corresponding data requested by the subsequent acquisition request message does not exist.

12. The device according to claim 1, wherein, the communicator, when the storage controller fails to write or read the data, transmits a message to the communication device, the message indicating failure of writing or reading.

13. The device according to claim 1, wherein,
the response message generator acquires the data read out by the storage controller and generates the response message containing the data, and
the communicator transmits the response message to the communication device in reply to the subsequent acquisition request message.

14. The device according to claim 1, wherein, the storage controller controls reading or writing of the response message containing the data, for the plurality of storages.

15. The device according to claim 14, wherein,
the circuitry is configured to implement a writer,
the storage manager selects the storage to write the response message, from the plurality of storages excluding the invalid storage,
the writer requests the storage controller to write the response message to the storage selected by the storage manager, and
the storage controller writes the response message to the storage based on the request from the writer.

16. A data transfer method by a data transfer device that communicates with a communication device via a network, comprising:
- managing correspondence information between data written by a storage controller and a storage to which the data is written, the storage controller controlling reading data from and writing data to a plurality of storages;
- managing an invalid storage, the invalid storage being a storage that the storage controller failed to read or write data;
- receiving a data storage request message to store;
- generating a response message that contains the data requested by the data storage request message to be stored, the response message being generated in response to receiving the data storage request message to store the data;
- writing the response message containing the data to a storage in response to receiving the data storage request message,
- managing correspondence information between the response message and the storage to which the response message is written, the response message containing the data being generated and stored for output responsive to a subsequent acquisition request message to retrieve the data contained in the response message;
- specifying the storage storing the response message containing the data in response to the subsequent acquisition request message according to the correspondence information between the response message and the storage to which the response message is written, the subsequent acquisition request message for the data contained in the response message being received from the communication device; and
- requesting the storage controller to read the response message containing the data from the storage specified by the specifier when the storage is not the invalid storage and not requesting the storage controller to read the response message containing the data when the storage is the invalid storage.

17. The method according to claim 16, further comprising:
- controlling, by the storage controller, reading or writing of the response message containing the data, for the plurality storages.

18. A non-transitory computer readable medium having a program stored therein which causes a computer when executed by the computer, to execute processing to perform a method comprising:
- managing correspondence information between data written by a storage controller and a storage to which the data is written, the storage controller controlling reading data from and writing data to a plurality of storages;
- managing an invalid storage, the invalid storage being a storage that the storage controller failed to read or write data;
- receiving a data storage request message to store data;
- generating a response message that contains the data requested by the data storage request message to be stored, the response message being generated in response to receiving the data storage request message to store the data;
- writing the response message containing the data to a storage in response to receiving the data storage request message;
- managing correspondence information between the response message and the storage to which the response message is written, the response message containing the data being generated and stored for output responsive to a subsequent acquisition request message to retrieve the data contained in the response message;
- specifying a storage storing the data requested by the subsequent acquisition request message according to the correspondence information between the response message and the storage to which the response message is written, the subsequent acquisition request message for the data contained in the response message being received from a communication device; and
- requesting the storage controller to read the response message containing the data from the storage specified by the specifier when the storage is not the invalid storage and not requesting the storage controller to read the response message containing the data when the storage is the invalid storage.

19. The medium according to claim 18 having the program which causes the computer to execute processing to perform the method further comprising:
- controlling, by the storage controller, reading or writing of the response message containing the data, for the plurality of storages.

20. A data transfer device that transfers data between a communication device and a plurality of storages, comprising:
- a communicator to communicate with the communication device via a network;
- a specifier to receive an acquisition request message for data from the communication device and specify a storage storing the data from among the storages, according to correspondence information between data and the storages in which data is stored; and
- a storage controller connected to the storages, to read out the data requested by the acquisition request message from the storage specified by the specifier, wherein
the communicator transmits the data read out from the specified storage to the communication device, and
when the specified storage is an invalid storage being a storage from/into which data reading or data writing has failed before the acquisition request message is received, the storage controller transmits, without accessing the specified storage to read out the data, a response message indicating that the data requested by the acquisition request message is not present, to the communication device.

* * * * *